United States Patent
Kelly et al.

(10) Patent No.: US 10,089,131 B2
(45) Date of Patent: Oct. 2, 2018

(54) COMPUTE CLUSTER LOAD BALANCING BASED ON DISK I/O CACHE CONTENTS

(71) Applicant: Dell Products, LP, Round Rock, TX (US)

(72) Inventors: John Kelly, Limerick (IE); Yinglong Jiang, Limerick (IE)

(73) Assignee: Dell Products, LP, Round Rock, TX (US)

( * ) Notice: Subject to any disclaimer, the term of this patent is extended or adjusted under 35 U.S.C. 154(b) by 268 days.

(21) Appl. No.: 14/789,855

(22) Filed: Jul. 1, 2015

(65) Prior Publication Data

US 2017/0003998 A1  Jan. 5, 2017

(51) Int. Cl.
G06F 9/455 (2018.01)
G06F 3/06 (2006.01)

(52) U.S. Cl.
CPC ............ *G06F 9/45558* (2013.01); *G06F 3/06* (2013.01); *G06F 2009/45579* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 6,944,785 B2 | 9/2005 | Gadir et al. | |
| 2009/0187904 A1* | 7/2009 | Serebrin | G06F 9/455 718/1 |
| 2013/0159487 A1 | 6/2013 | Patel et al. | |
| 2013/0185408 A1 | 7/2013 | Ngo | |
| 2015/0095446 A1* | 4/2015 | Ramasubramanian | H04L 67/1008 709/214 |
| 2016/0147549 A1* | 5/2016 | Sivak | G06F 9/45558 718/1 |

OTHER PUBLICATIONS

Introspection-based Memory De-duplication and Migration, Mar. 17, 2013.*

* cited by examiner

*Primary Examiner* — Sisley Kim
(74) *Attorney, Agent, or Firm* — Larson Newman, LLP (57) ABSTRACT

Load balancing reduces memory consumption in a virtual computing environment. Disk blocks in a cluster of hosts are monitored for redundancy. Execution of virtual machines may be migrated to different hosts within the cluster to balance loading.

20 Claims, 10 Drawing Sheets

COMPUTE CLUSTER LOAD BALANCING BASED ON DISK I/O CACHE CONTENTS

FIELD OF THE DISCLOSURE

The present disclosure generally relates to information handling systems, and more particularly relates to load balancing of virtual machines between physical nodes in a compute cluster.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
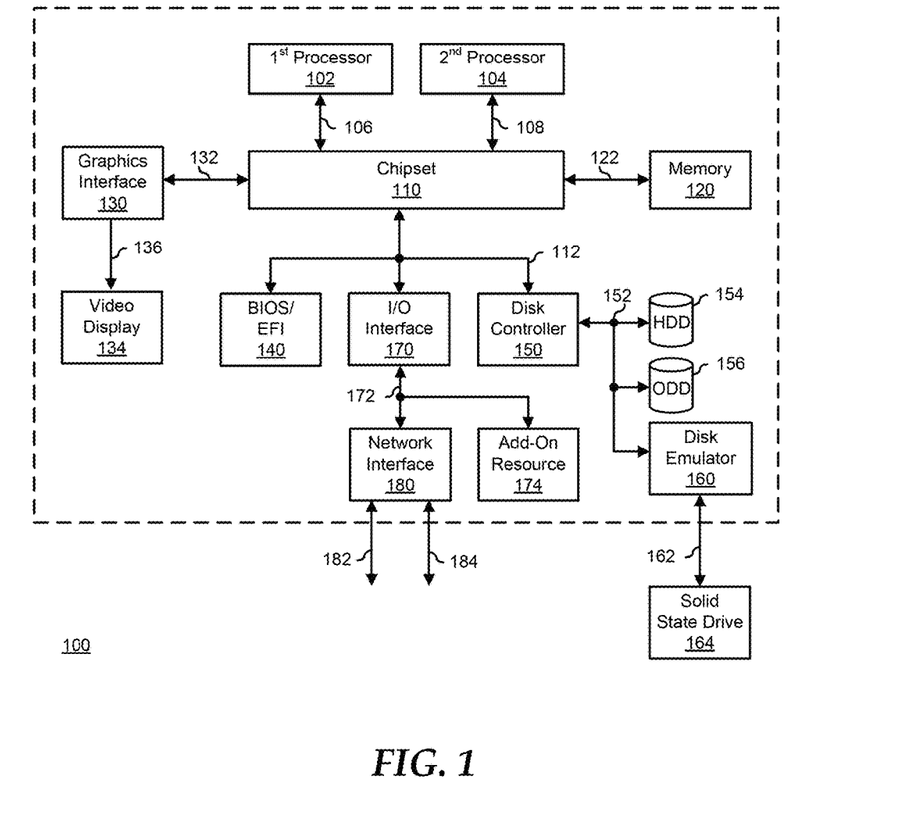
FIG. 1 is a block diagram illustrating an information handling system according to an embodiment of the present disclosure.

FIG. 1 illustrates a generalized embodiment of information handling system 100, according to exemplary embodiments. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
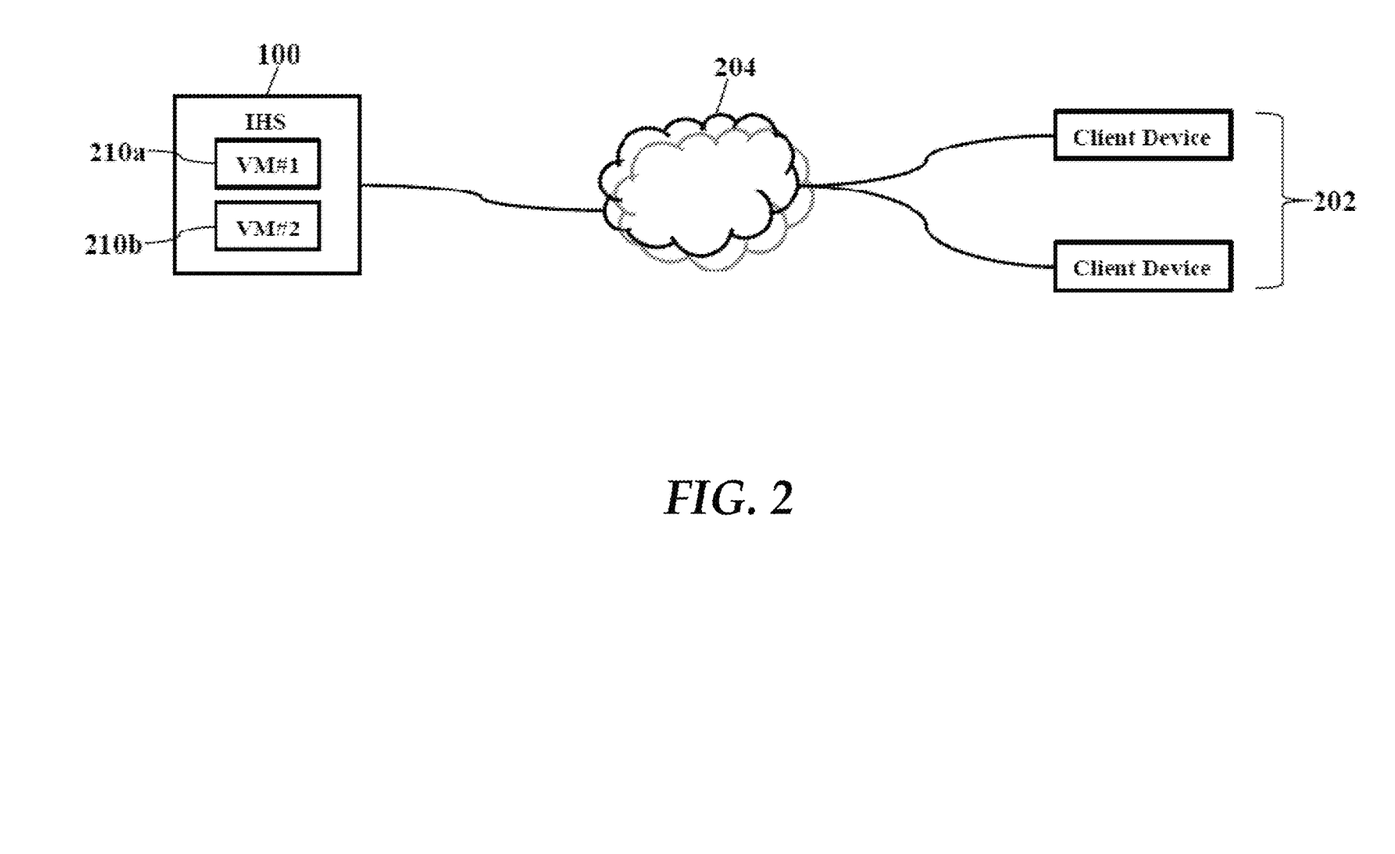
FIGS. 2-3 illustrate a virtual computing environment, according to exemplary embodiments.
Figure 3:
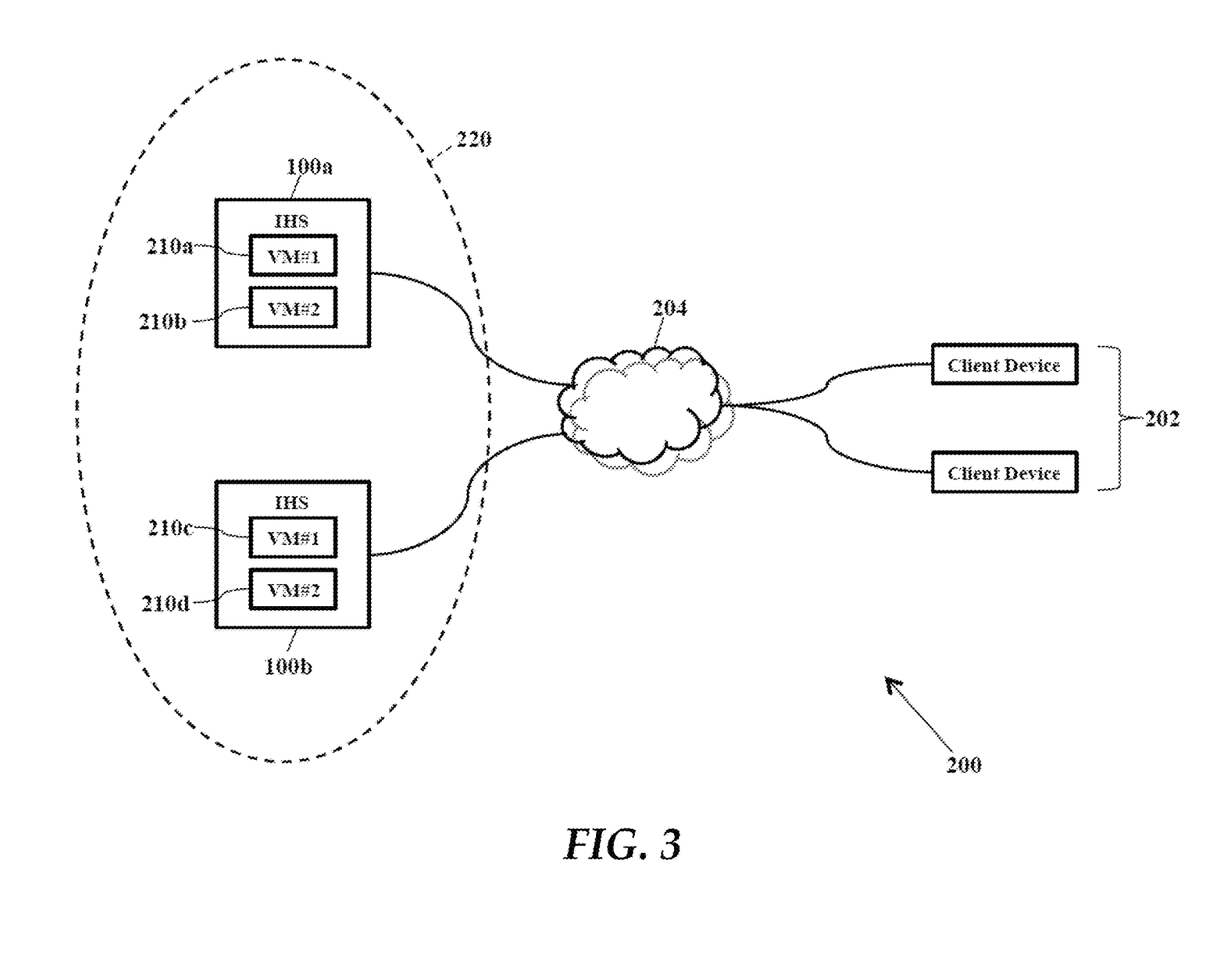

FIGS. 2-3 illustrate a virtual computing environment 200, according to exemplary embodiments. Here the information handling system ("IHS") 100 may provide virtual computing and/or virtual hardware resources to one or more client devices 202. While FIG. 2 only illustrates a few client devices 202, in practice there may be many client devices, perhaps even hundreds or thousands of client machines. Regardless, the information handling system 100 may lend or share its hardware, computing, and programming resources with one of the client devices 202. The client devices 202 communicate with the information handling system 100 using a communications network 204 to send and receive electronic data. The electronic data is packetized into packets of data according to a packet protocol (such as any of the Internet Protocols). The packets of data contain bits or bytes of data describing the contents, or payload, of a message. A header of each packet of data may contain routing information identifying an origination address and/or a destination address. The information handling system 100 and the client devices 202 may thus inspect the packets of data for routing information.

The virtual computing environment 200 shares resources. The communications network 204 thus allows the information handling system 100 to operate as a virtual, remote resource. Virtual computing is well known, so this disclosure need not delve into the known details. Suffice it to say that the information handling system 100 may present or operate as one or more virtual machines 210. Each one of the virtual machines 210 may provide some processing or application resource to any of the client devices 202. While FIG. 2 only illustrates two virtual machines 210a and 210b, the number or instantiations may be several or even many, depending on complexity and resources.

FIG. 3 illustrates a cluster 220 in the virtual computing environment 200. There may be any number of information handling systems 100 operating as nodes in the cluster 220. Clustering is usually carried out to provide high availability (i.e., redundancy in the case of node failure). For simplicity, though, FIG. 3 only illustrates two (2) of the information handling systems (illustrated, respectively, as reference numerals 100a and 100b). Each one of the information handling systems 100a and 100b may thus host multiple virtual machines (such as 210a through 210d). The virtual computing environment 200 may thus present shared resources for hundreds or thousands of the client devices 202. The information handling systems 100a and 100b may communicate using the packetized communications network 204, as is known.

Load balancing may be desired. As the virtual computing environment 200 may provide resources to hundreds or thousands of the client devices 202, optimal management techniques may be desired. As the client devices 202 make requests for data or processing, some of the shared resources may be over utilized. The virtual computing environment 200 may thus balance or distribute the loads among the information handling systems 100 in the cluster 220.

Figure 4:
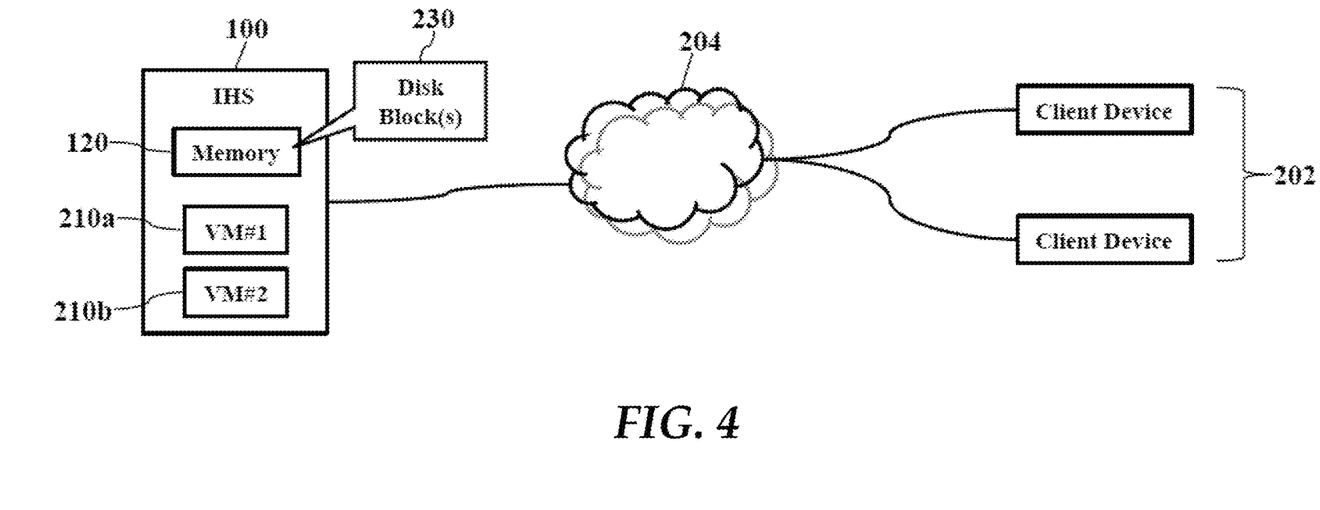
FIGS. 4-5 illustrate caching of disk I/O to memory, according to exemplary embodiments.
Figure 5:
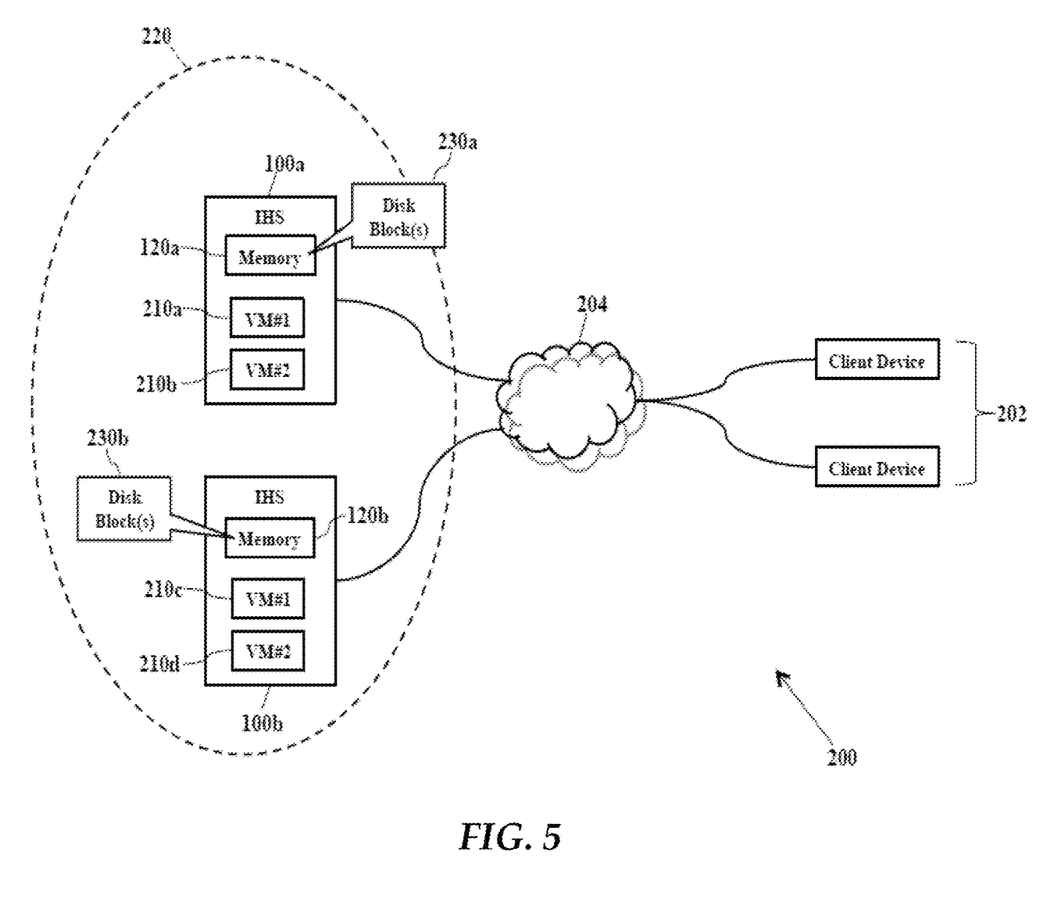

FIGS. 4-5 illustrate caching of disk I/O to memory, according to exemplary embodiments. Here exemplary embodiments may use disk blocking when balancing workloads. The term disk blocking refers to caching disk blocks of data to memory. When the information handling system 100 provides virtual resources to any client device 202, one or more disk blocks 230 may be generated. FIG. 4 illustrates the disk blocks 230 being stored in the memory 120 (such as random access memory) of the information handling system 100. The disk blocks 230, however, may be locally stored in other memory devices or remotely stored at any accessible/addressable location using the communications network 204. Caching of disk blocks allows the information handling system 100 to store and to retrieve data from the memory 120 in one or more of the disk blocks 230. Each disk block 230 may thus be a sequence of bits or bytes of data having a character length. Exemplary embodiments optimize the caching of frequently used disk blocks 230 to the memory 120. For example, commonly used disk blocks 230 containing input/output (I/O) operations in the virtual computing environment 200 may be written to random access memory (RAM). Because popular disk blocks 230 may be cached to RAM, the capacity of the information handling system 100 to accept disk I/O requests without latency may be increased, as a higher percentage of these requests will be redirected to RAM. A greater percentage of the I/O operations per second (or "IOPS") will thus be cached to RAM, thus increasing the capacity of the host machines in the virtual computing environment 200.

FIG. 5 further illustrates the virtual computing environment 200. In FIG. 5, the virtual computing environment 200 has the multiple hosts (e.g., the information handling systems 100a and 100b) arranged or clustered as the cluster 220. The hosts in the cluster 220 may thus generate many disk blocks 230. Indeed, in actual implementation, as each one of the information handling systems 100a and 100b provides virtual resources, the cluster 220 may store and retrieve millions or even trillions of the disk blocks 230.

Exemplary embodiments may thus use caching when load balancing. As the multiple information handling systems 100 may generate so many disk blocks 230, there may often be times or instances in which identical disk blocks 230 may be generated. That is, two (2) or more of the virtual machines 210 may request or store the same disk blocks 230 when providing some virtual resource. Exemplary embodiments may thus inspect and compare the content contained in any one of the disk blocks 230 generated within the cluster 220. If two or more resources use the same disk blocks 230, then exemplary embodiments only perform a single store or retrieval of the disk block 230. Exemplary embodiments may thus reduce or eliminate redundant calls for redundant disk blocks 230.

Figure 6:
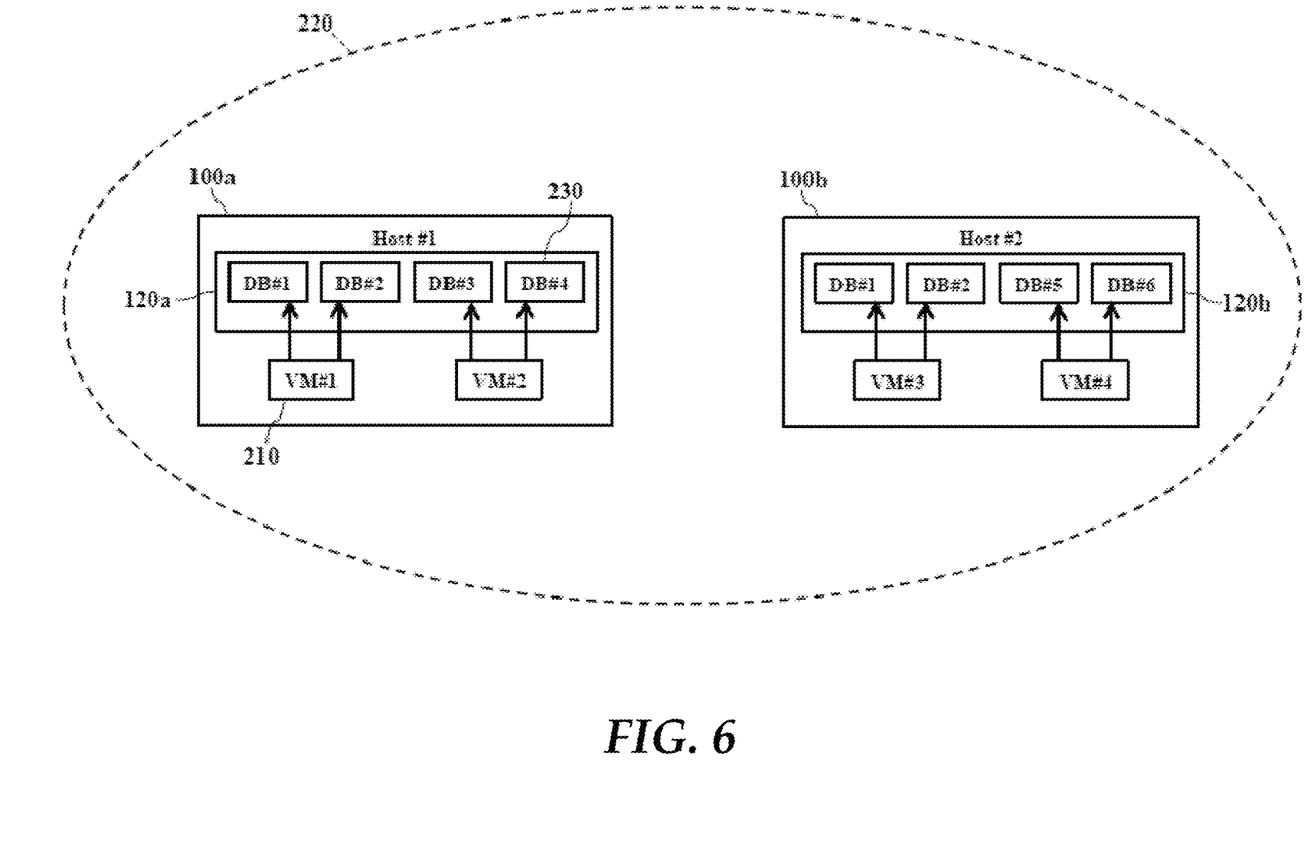
FIGS. 6-7 are schematics illustrating load balancing based on disk I/O cache contents, according to exemplary embodiments.
Figure 7:
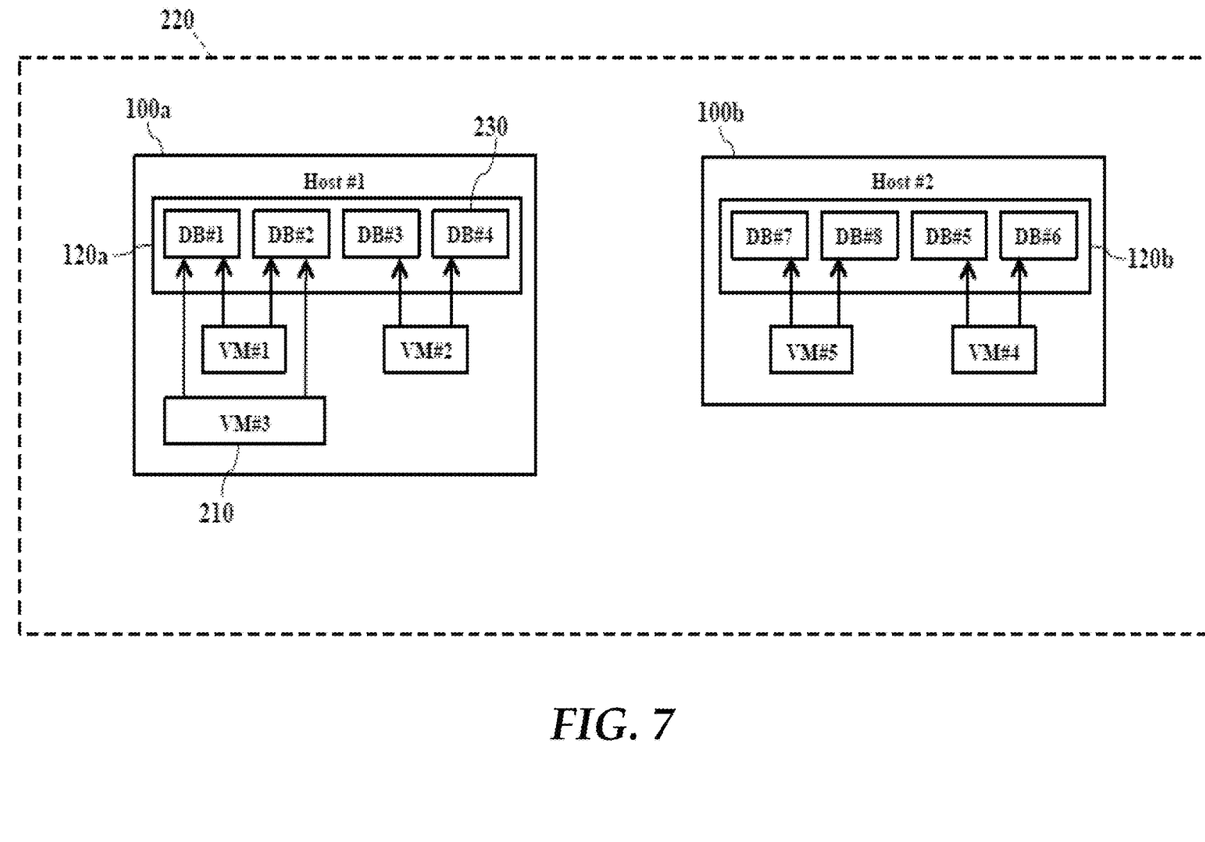

FIGS. 6-7 are schematics illustrating load balancing based on disk I/O cache contents, according to exemplary embodiments. Here the disk blocks 230 are cached or stored to the memory 120 (such as random access memory) for load balancing. As FIG. 6 illustrates, the two different information handling systems 100a and 100b act as hosts for different virtual machines (illustrated "VM#1" through "VM#4"). FIG. 6 illustrates conventional load balancing techniques in which each virtual machine 210 access the disk blocks 230 that are locally stored in the memory 120 of its physical host machine. For example, virtual machine VM#1 accesses disk blocks "DB#1" and "DB#2" that are locally stored in the random access memory 120a of the corresponding "Host#1." Virtual machine VM#2 accesses disk blocks DB#3 and DB#4 also locally stored in the random access memory 120a of the corresponding Host#1. Virtual machine VM#3 accesses the disk blocks DB#1 and DB#2 that are locally stored in the random access memory 120b of the corresponding Host#1. Virtual machine VM#4 accesses disk blocks DB#5 and DB#6 also stored in the random access memory 120b of the corresponding Host#2.

Notice the redundant storage. In FIG. 6, both Host#1 and Host#2 store disk blocks DB#1 and DB#2 in their corresponding random access memories 120a and 120b. When virtual machine VM#3 needs access to the disk blocks DB#1 and DB#2, virtual machine VM#3 calls or retrieves the random access memory 120b of Host#2. That is, even though Host#1 already stores disk blocks DB#1 and DB#2, virtual machine VM#3 calls the memory 120b of its Host#2 for the identical disk blocks DB#1 and DB#2. The memory 120b of Host#2 thus inefficiently stores redundant disk blocks that are already available on a different physical host in the same cluster 220.

FIG. 7, though, illustrates load balancing. Here exemplary embodiments may redirect the virtual machines 210 for improved load balancing. As the disk blocks 230 are generated within the cluster 220, exemplary embodiments may inspect and compare the content of the disk blocks 230. Exemplary embodiments may then track the storage location for each one of the different disk blocks 230. Exemplary embodiments may even determine a count of the disk blocks 230 having the same identical content, the virtual machines 210 accessing the same identical disk block(s) 230, and/or the different hosts that redundantly store the identical disk blocks 230. As identical disk blocks 230 need not be redundantly stored, exemplary embodiments may swap which physical hosts execute which virtual machines 210. This swapping or migration activity reduces or even eliminates redundant storage of the disk blocks 230. In FIG. 7, for example, virtual machine VM#3 needs access to disk blocks DB#1 and DB#2. As disk blocks DB#1 and DB#2 are known to be stored on Host#1, exemplary embodiments may move or redirect some or all of the execution of virtual machine VM#3 to different Host#1. That is, execution of virtual machine VM#3 may be migrated to different Host#1 to eliminate redundant storage of the identical disk blocks DB#1 and DB#2. Virtual machines VM#1 and VM#3 thus share the disk blocks DB#1 and DB#2 hosted by Host#1.

Memory is conserved for reallocation. When execution of virtual machine VM#3 is migrated or redirected to Host#1, the memory 120b of Host#2 no longer needs to store disk blocks DB#1 and DB#2. The memory 120b of Host#2 may thus be freed up for other uses. In FIG. 7, then, new disk blocks DB#7 and DB#8 may be moved into the memory 120b, thus allowing Host#2 to assume execution of new virtual machine VM#5. So, when FIGS. 6 and 7 are compared, exemplary embodiments permit the cluster 220 to increase its virtual execution capacity by only storing a single instance of each disk block 230. That is, the execution number of virtual machines 210 has increased for the same number of physical hosts in the cluster 220. Again comparing FIGS. 6 and 7, the number of the virtual machines 210 has increased (VM#1 through VM#5), even though the number of the hosting machines is constant or unchanged. Because the commonly used disk blocks 230 are cached to RAM, the number of I/O operations per second (or "IOPS") is increased. A greater percentage of the IOPS will thus be cached to RAM, thus further increasing the capacity of the host machines in the cluster 220.

Figure 8:
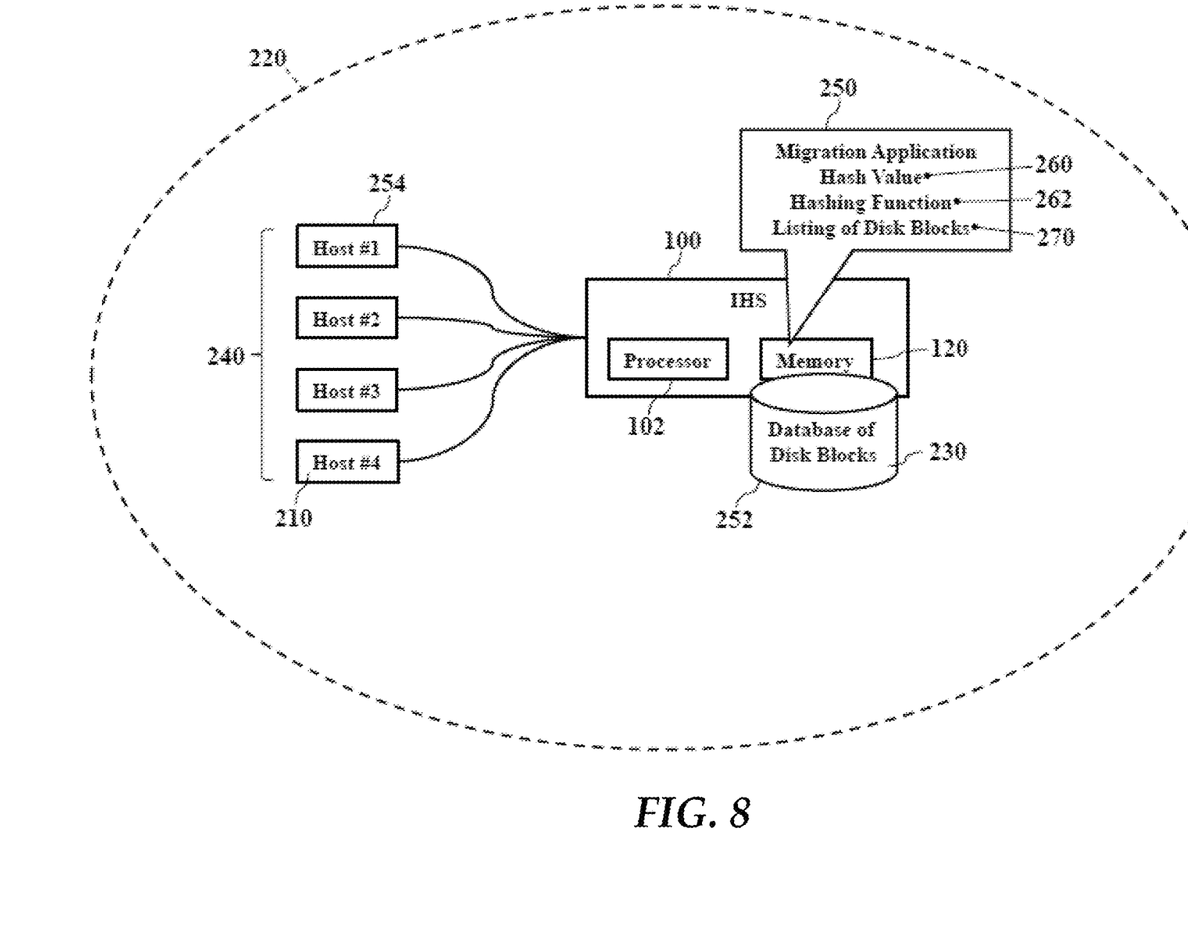
FIGS. 8-9 are schematics further illustrating memory content aware load balancing, according to exemplary embodiments.
Figure 9:
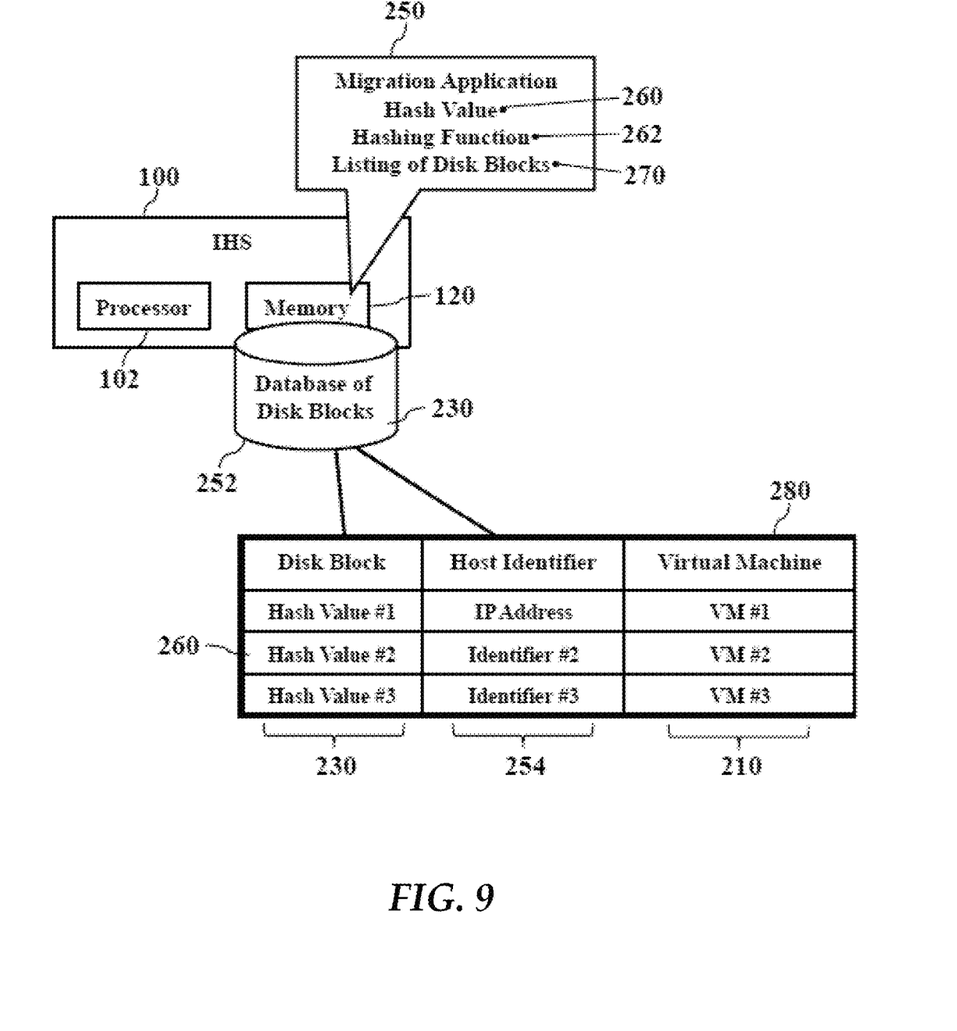

FIGS. 8-9 are schematics further illustrating load balancing, according to exemplary embodiments. Here the information handling system ("IHS") 100 monitors the disk blocks 230 generated, stored, and/or called by the hosting machines 240 within the cluster 220 of the virtual computing environment 200. The information handling system 100 performs management functions for the hosting machines 240 in the cluster 220. The information handling system 100, for example, may itself be a virtualization host and/or a virtual manager (such as a virtual desktop manager or a virtual desktop infrastructure manager). When the information handling system 100 manages load balancing, the information handling system 100 monitors the disk blocks 230 within the cluster 220. The processor 102, for example, executes a migration algorithm 250. FIG. 8 illustrates the migration algorithm 250 stored within the local memory 120, but the migration algorithm 250 may be stored in some other local or remotely accessible memory. Regardless, the migration algorithm 250 instructs the processor 102 to perform operations, such as inspecting and comparing the disk blocks 230 stored within the cluster 220.

The processor 102 tracks the disk blocks 230 using an electronic database 252 of disk blocks. FIG. 8 illustrates the electronic database 252 of disk blocks as being locally stored in the memory 120 of the information handling system 100, yet some or all of the entries in the electronic database 252 of disk blocks may be additionally or alternatively remotely stored. For simplicity, FIG. 9 illustrates the electronic database 252 of disk blocks as a table 280 that electronically maps, relates, or associates the different disk blocks 230 to their corresponding unique identifiers 254 associated with the different virtual machines 210 being executed within the cluster 220. The electronic database 252 of disk blocks may thus store the content of each disk blocks 230 in electronic database associations to unique identifiers 254 of the different virtual machines 210 being executed within the cluster 220. The unique identifier 254 is perhaps most commonly a unique network address (such as an Internet protocol address) assigned to the corresponding host machine 240, but the unique identifier 254 may be any alphanumeric combination. The electronic database 252 of disk blocks may thus be a central repository for the disk blocks 230 being shared or hosted by the virtual machines 210 in the cluster 220. Exemplary embodiments may thus query the electronic database 252 of disk blocks for a content representation of a disk block 230 and retrieve the identifiers 254 associated with the virtual machines 210 accessing or using the corresponding disk block 230. Exemplary embodiments may also conversely query for the identifier 254 associated with any virtual machine 210 and retrieve the corresponding disk block(s) 230 being used/accessed.

Hashing may be used. The electronic database 252 of disk blocks stores the content of each disk block 230. While exemplary embodiments may represent the content using any scheme, this disclosure uses hash values. That is, a hash value 260 may be determined for each disk block 230 using a hashing function 262. Hashing is well known and need not be explained. Suffice it to say that the electronic database 252 of disk blocks may store electronic database associations between different hash values 260 and the unique identifiers 254 of the different virtual machines 210 being executed by the hosts within the cluster 220. When any disk block 230 is hashed (using the hashing function 262), its corresponding hash value 260 may be determined and an entry added to the electronic database 252 of disk blocks. The electronic database 252 of disk blocks may thus be used to track which hash values 260 are being shared by which ones of the virtual machines 210. Exemplary embodiments may thus generate a listing 270 of disk blocks being used for each one of the virtual machines 210.

The multiple listings 270 of disk blocks may also be sorted or arranged to reveal migration opportunities. For example, one or more of the listings 270 of disk blocks may be arranged in descending order according to a compatibility measurement. For load balancing, exemplary embodiments track identical disk blocks 230. The listings 270 of disk blocks may thus be arranged in descending order according to the number of identical disk blocks (e.g., hash values 260). Exemplary embodiments may then execute migration activity to ensure that the virtual machines 210 reside on a host that maximizes utilization of disk I/O caching, ensuring that migration activity executes a check to assess if an existing allocation is actually optimal.

Figure 10:
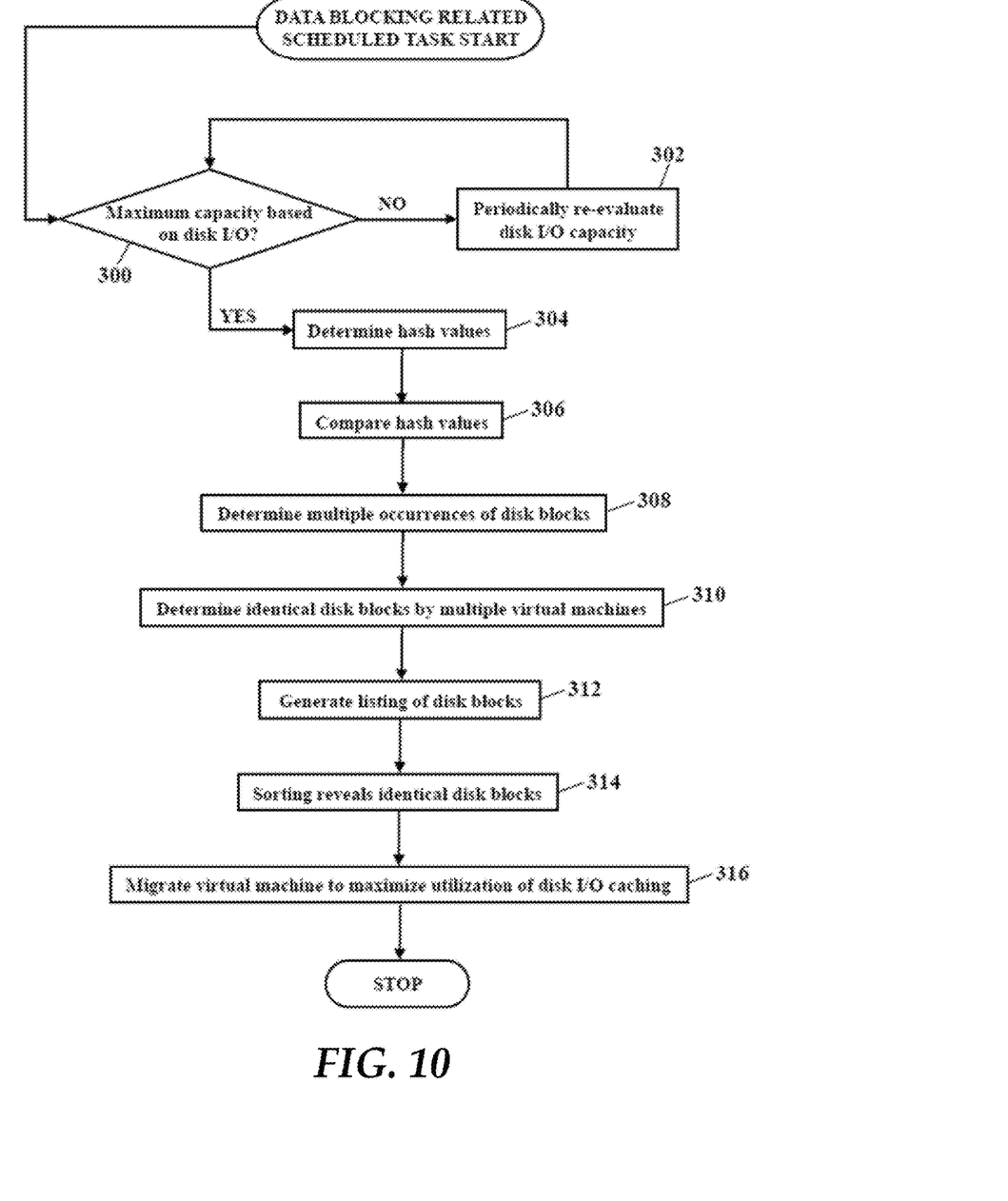
FIG. 10 is a flowchart illustrating a method or algorithm for caching of disk I/O blocks to memory, according to exemplary embodiments.

FIG. 10 is a flowchart illustrating a method or algorithm for load balancing, according to exemplary embodiments. Exemplary embodiments may check whether any host machine in the cluster 220 has reached a maximum capacity based on disk I/O (Block 300). For example, exemplary embodiments may time one or more I/O operations and compare to a pre-defined threshold. If the time is less than the threshold (such as 20 milliseconds), then perhaps load balancing is not needed. A periodic re-evaluation may thus be performed (Block 302). However, if the time equals or exceeds the threshold, a latency may indicate that a maximum disk capacity is determined. Exemplary embodiments may thus determine the hash value 260 for each disk block in the cluster 220 (Block 304). Exemplary embodiments may compare the hash values 260 (Block 306) to determine multiple occurrences of identical disk blocks 230 (Block 308) and to determine shared disk blocks 230 by multiple virtual machines (Block 310). The listing 270 of disk blocks may be generated for each virtual machine 210 (Block 312). The listing 270 of disk blocks may be sorted to reveal identical disk blocks 230 (Block 314). Migration of a virtual machine is performed to maximize utilization of disk I/O caching (Block 316).

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, comprising:
   generating, by a processor, electronic content representations of disk blocks associated with a cluster of hosts in a virtual computing environment, the hosts executing virtual machines providing services to clients;
   storing, in a memory accessible to the processor, an electronic database having electronic database associations between the electronic content representations of the disk blocks and Internet protocol (IP) addresses associated with the virtual machines;
   querying, by the processor, the electronic database for an electronic content representation of a single disk block;
   retrieving, by the processor, the IP addresses from the electronic database, each one of the IP addresses having an electronic database association with the electronic content representation of the single disk block;
   determining, by the processor, that the single disk block is redundantly stored by multiple hosts within the cluster in response to the IP addresses retrieved from the electronic database; and
   swapping, by the processor, execution of the virtual machines to a single host in the cluster in the virtual computing environment, such that the virtual machines share access to the single disk block from the single host.

2. The method of claim 1, further comprising increasing a number of the virtual machines executed by the hosts in the virtual computing environment.

3. The method of claim 1, further comprising determining multiple occurrences of the electronic content representation of the single disk block.

4. The method of claim 1, further comprising determining a count of the IP addresses retrieved from the electronic database having the electronic database association with the electronic content representation of the single disk block.

5. The method of claim 1, further comprising determining a count of the virtual machines accessing the single disk block.

6. The method of claim 1, further comprising determining a count of the multiple hosts within the cluster that redundantly store the single disk block.

7. The method of claim 1, further comprising generating a listing of disk blocks associated with each virtual machine of the virtual machines in the virtual computing environment.

8. An information handling system, comprising:
   a processor; and
   a memory accessible to the processor, the memory storing instructions that when executed cause the processor to perform operations, the operations comprising:
     generating hash values representing disk blocks associated with a cluster of hosts in a virtual computing environment, the hosts executing virtual machines providing services to clients;
     storing an electronic database having electronic database associations between the hash values representing the disk blocks and Internet protocol (IP) addresses associated with the virtual machines;
     querying the electronic database for a hash value of the hash values, the hash value representing a single disk block;
     retrieving the IP addresses from the electronic database, each IP address of the IP addresses associated with a different one of the virtual machines, and the each IP address having an electronic database association with the hash value representing the single disk block;

determining that the single disk block is redundantly stored by multiple hosts within the cluster in response to the IP addresses retrieved from the electronic database; and swapping execution of the virtual machines to a single host in the cluster in the virtual computing environment, such that the virtual machines share access to the single disk block from the single host.

9. The system of claim 8, wherein the operations further comprise determining the single host has maximum capacity.

10. The system of claim 8, wherein the operations further comprise determining multiple occurrences of the electronic content representation of the single disk block.

11. The system of claim 8, wherein the operations further comprise determining a count of the IP addresses retrieved from the electronic database.

12. The system of claim 8, wherein the operations further comprise determining a count of the virtual machines accessing the single disk block.

13. The system of claim 8, wherein the operations further comprise determining a count of the multiple hosts within the cluster that redundantly store the single disk block.

14. The system of claim 8, wherein the operations further comprise generating a listing of disk blocks associated with each virtual machine of the virtual machines in the virtual computing environment.

15. A memory device storing instructions that when executed cause a processor to perform operations, the operations comprising:

generating hash values representing disk blocks associated with a cluster of hosts in a virtual computing environment, the hosts executing virtual machines providing services to clients;

storing an electronic database having electronic database associations between the hash values representing the disk blocks and Internet protocol (IP) addresses associated with the virtual machines;

querying the electronic database for a hash value representing a single disk block;

retrieving the IP addresses from the electronic database having the electronic database associations with the hash value representing the single disk block;

determining the single disk block is redundantly stored by multiple hosts within the cluster based on the IP addresses associated with the virtual machines in response to the IP addresses retrieved from the electronic database; and migrating execution of the virtual machines to a single host in the cluster in the virtual computing environment, such that the virtual machines share access to the single disk block from the single host.

16. The memory device of claim 15, wherein the operations further comprise determining the single host in the cluster has maximum capacity.

17. The memory device of claim 15, wherein the operations further comprise determining multiple occurrences of the electronic content representation of the single disk block.

18. The memory device of claim 15, wherein the operations further comprise determining a count of the IP addresses retrieved from the electronic database.

19. The memory device of claim 15, wherein the operations further comprise determining a count of the virtual machines accessing the single disk block.

20. The memory device of claim 15, wherein the operations further comprise determining a count of the multiple hosts within the cluster that redundantly store the single disk block.

* * * * *